US008007560B2

(12) United States Patent
Chen et al.

(10) Patent No.: US 8,007,560 B2
(45) Date of Patent: Aug. 30, 2011

(54) USE OF THE FLUE GAS DESULFURIZATION BYPRODUCT FROM THERMAL POWER PLANTS AND FACILITIES AND A METHOD FOR ALKALI SOIL AMELIORATION

(75) Inventors: Changhe Chen, Beijing (CN); Xuchang Xu, Beijing (CN); Masayoshi Sadakata, Tokyo (JP); Ligeng Wu, Inner Mongolia (CN); Shujuan Wang, Beijing (CN); Yuejin Li, Inner Mongolia (CN); Yan Li, Beijing (CN)

(73) Assignee: Tsinghua University, Beijing (CN)

( * ) Notice: Subject to any disclaimer, the term of this patent is extended or adjusted under 35 U.S.C. 154(b) by 745 days.

(21) Appl. No.: 11/469,162

(22) Filed: Aug. 31, 2006

(65) Prior Publication Data

US 2007/0157690 A1    Jul. 12, 2007

(30) Foreign Application Priority Data

Jan. 6, 2006    (CN) .......................... 2006 1 1111600

(51) Int. Cl.
*C05B 19/02*    (2006.01)
*C05D 9/00*    (2006.01)
(52) U.S. Cl. ................................. 71/47; 71/31
(58) Field of Classification Search ........................ None
See application file for complete search history.

(56) References Cited

U.S. PATENT DOCUMENTS 5,435,821 A * 7/1995 Duvdevani et al. ............... 71/28
5,628,811 A * 5/1997 College et al. .................... 71/62

OTHER PUBLICATIONS

Rose, Mary Ann and Smith, Elton. "Fertilizing Landscape Plants." Horticulture and Crop Science. 2001. Ohio State University. <http://web.archive.org/web20010320063717/http://ohioline.osu.edu/hyg-fact/1000/1002.html>.*
Gao, Gary, Boggs, Joe and Chatfield, Jim. "Soil Testing is an Excellent Investment for Garden Plants and Commercial Crops." Horticulture and Crop Science. 2003. Ohio State University. <http://web.archive.org/web/20030604200421/http://ohioline.osu.edu/hyg-fact/1000/1132.html>.*
Dixon, H. E., "Magnesium Alkaline Soil Amelioration", *Formation and Amelioration of Alkali Soil*, Yanjiantude, et al. Ed., (1980), p. 95 (with English translation).

* cited by examiner

*Primary Examiner* — Melvin Mayes
*Assistant Examiner* — Sheng H Davis
(74) *Attorney, Agent, or Firm* — Morgan Lewis & Bockius LLP

(57) ABSTRACT

The present invention discloses a novel use of the FGD byproduct from thermal power plants and facilities and the specific method for alkali soil amelioration. In this method, after sampling, amount of $Na_2CO_3$, $NaHCO_3$, $Mg(HCO_3)_2$, ±)Na and ±)Mg can be calculated by analysis. According to the component in FGD byproduct from thermal power plants and facilities, the amount for FGD byproduct from thermal power plants and facilities needed in the alkali soil to be ameliorated can be determined. The FGD byproduct from thermal power plants and facilities are scattered on the surface according to the alkalization degree. After irrigating, the soil is operated just like common land. This invention allows the FGD byproduct from thermal power plants and facilities to be utilized effectively and economically, changing from it from waste to a useful substance. Moreover, it provides a method for alkali soil amelioration, which is fast, efficient, consumes less water, is cost effective, and promising.

4 Claims, No Drawings

USE OF THE FLUE GAS DESULFURIZATION BYPRODUCT FROM THERMAL POWER PLANTS AND FACILITIES AND A METHOD FOR ALKALI SOIL AMELIORATION

CROSS-REFERENCE TO RELATED APPLICATIONS

This application claims priority to and the benefit of the filing of Chinese Patent Application Serial No. 200610011116.0, entitled "Use of the Flue Gas Desulfurization Byproduct from Thermal Power Plants and Facilities and a Method for Alkali Soil Amelioration", filed on Jan. 6, 2006, and the specification and claims thereof are incorporated herein by reference.

TECHNICAL FIELD

The present invention relates to the use of byproduct of lime or limestone/gypsum process flue gas desulfurization (FGD byproduct) from thermal power plants and facilities, and a method for alkali soil amelioration, especially, the present invention relates to a method for alkali soil amelioration by using the flue gas desulfurization byproduct from thermal power plants and facilities.

TECHNOLOGY BACKGROUND

The major components of the flue gas desulfurization byproduct from thermal power plants and facilities (briefly referred to as FGD byproduct) are gypsum ($CaSO_4 \cdot 2H_2O$) or a mixture of gypsum and calcium sulfite ($CaSO_3$). The byproduct further contains a certain amount of powder coal ash and water. Relatively pure calcium sulfate (gypsum) is common building material; while, the calcium sulfite is waste, and because of its instability, it is easy to induce secondary pollution to the environment. In fact, because China is rich in natural gypsum, the price is not high; and it is not necessary to directly use gypsum that contains a lot of water, ash and impurity, generated from flue gas desulfurization as building gypsum, because that will cost so much, that is, the FGD byproduct only can be used after being further refined and dehydrated. Therefore, there is no competitive power on the market in China for flue gas desulfurization byproduct used as building gypsum. Only a little of it is used as cement additives. Most of it is thrown away as waste.

At present, the methods for electric power plants to treat the FGD byproduct chiefly are landfill, storage in ash storage pool and the like. However, when disposing of 10 thousand tons of the desulfurization byproduct, a fossil-fuel power plant needs to takeover about 200 $m^2$ of land, and it costs 2.5 to 10 thousand US dollars for operating the ash field, and 2.5~6.75 thousand US dollars for ash transportation. So, from the aspect of environmental protection or from the aspect of economy, the effective use of the FGD byproduct is a subject that needs to be studied.

At present, there are mainly four aspects for alkali soil amelioration, which are water conservancy amelioration methods (irrigation, drainage, warping, rice planting, anti seepage and the like), agriculture amelioration methods (land level off, cultivation improvement, use of alien earth, fertilization, insemination, crop rotation, inter-planting and the like), biology amelioration methods (halophyte and grazing planting, green manure fertilization, tree planting and the like), and chemistry amelioration methods (the application of improver-additives, such as gypsum, phosphor gypsum, calcium sulfite and the like).

When using gypsum to ameliorate soil, HE Dixin (he used pure gypsum not the FGD byproduct for alkali soil amelioration. See, the Formation and Amelioration of Alkali Soil, 1980) calculated the application amount mainly consider the difference value generated from exchangeable sodium subtracting 5% or 10% of alkalization degree as the reference for gypsum application amount. Regarding $Na_2CO_3$ and $NaHCO_3$, they were taken into the application amount when their amount were too much, while they were ignored when their amounts were so less. Moreover, there was no consideration for the exchangeable magnesium in the calculation. Therefore, the calculated application amount was less than the amount needed in factual amelioration, which would affect the effect of amelioration.

SUMMARY OF INVENTION

An object of the invention is to provide the use of FGD byproduct instead of natural gypsum or other relatively pure gypsum for alkali soil amelioration, so that the FGD byproduct can be used economically, thus changing waste into a useful substance.

Another object of the invention is to provide a method for alkali soil amelioration by using the FGD byproduct, which is fast, effective, consumes less water, is cost-effective, and promising.

After intensive study, the inventors of the invention found that the above problems of the invention can be solved by the following items, leading the completion of the invention.

That is, the invention provides the following items:

1. Use of the FGD byproduct (lime or limestone/gypsum process) for alkali soil amelioration.
2. The use according to item 1, wherein the amount of the FGD byproduct (lime or limestone/gypsum process) is determined by Measuring the contents of $CO_3^{2-}$, $HCO_3^-$, $SO_4^{2-}$, $Cl^-$, $Ca^{2+}$, $Mg^{2+}$, $K^+$, and $Na^+$ in the alkali soil, and the contents of the exchangeable cations of K, Na, Ca, Mg, so as to determine the mole amounts of $Na_2CO_3$, $NaHCO_3$, $Mg(HCO_3)_2$, exchangeable sodium ion, and exchangeable magnesium ion per kilograms of the alkali soil;

wherein the theoretical application amount of the FGD byproduct applied per kilograms of the alkali soil is determined by the following formula (1), $$M = (\tfrac{1}{2}M_1 + M_2 + M_3 + M_4 + \tfrac{1}{2}M_5) \times Mn/(C \times 1000) \quad (1)$$

wherein:

M represents the theoretical application amount of the FGD byproduct, kilograms;

C represents the percent content by weight of the calcium sulfate in the FGD byproduct;

Mn represents the molecular weight of the calcium sulfate;

$M_1$ represents the molar amount of the exchangeable sodium ion in the alkali soil, $M_2$ represents the molar amount of the exchangeable magnesium ion in the alkali soil, $M_3$ represents the molar amount of $Mg(HCO_3)_2$ in the alkali soil, $M_4$ represents the molar amount of $Na_2CO_3$ in the alkali soil, and $M_5$ represents the molar amount of $NaHCO_3$ in the alkali soil, Wherein the actual application amount of the FGD byproduct is 110% to 150%, preferably 120% to 140% of the theoretical application amount, According to the above and the soil with different alkalization degree, the range of application amount of the FGD byproduct is as follows, the application amount of the FGD byproduct is 18,000~22,500 kilograms per hectare for the alkali soil being slightly alkalized, the application amount of the FGD byproduct is above 22,500-30,000 kilograms per hectare for the alkali soil being moderately alkalized, and the application amount of the FGD byproduct is above 30,000-75,000 kilograms per hectare for the alkali soil being heavily alkalized.

3. A method for improving alkali soil by using the FGD byproduct (lime or limestone/gypsum process), comprising Applying such FGD byproduct into the alkali soil to be ameliorated, wherein the application amount of the FGD byproduct is 18,000~22,500 kilograms per hectare for the alkali soil being slightly alkalized, the application amount of the FGD byproduct is above 22,500-30,000 kilograms per hectare for the alkali soil being moderately alkalized, and the application amount of the FGD byproduct is above 30,000-75,000 kilograms per hectare for the alkali soil being heavily alkalized, wherein the actual application amount of the FGD byproduct is obtained by the above formula (1).

4. The method according to item 3, further comprising:

Plowing the alkali soil when the FGD byproduct (lime or limestone/gypsum process) is applied, wherein the plowing depth is 20 to 40 cm, so as to make them being mixed well, wherein applying such FGD byproduct in the spring, and planting crops in the same year for an alkali soil having an alkalization degree of 10 to 30%, and applying the FGD byproduct in the summer, and not planting crops in the same year but planting in the next year for an alkali soil having an alkalization degree of above 30%.

5. The method according to item 3, further comprising,

Irrigating the alkali soil after such FGD byproduct is applied.

6. The method according to item 5, wherein

The irrigation water amount is about 1500 to 3000 cubic meters per hectare.

Specifically, the method for alkali soil amelioration by using FGD byproduct from thermal power plants and facilities comprises the steps of:

1) Sampling the alkali soil to be ameliorated, drying in the shade and screening, and then, mixing with water in a ratio of 1:1 by weight; and taking the extracting solution, and analyzing the contents of $CO_3^{2-}$, $HCO_3^-$, $SO_4^{2-}$, $Cl^-$, $Ca^{2+}$, $Mg^{2+}$, $K^+$, and $Na^+$ in the alkali soil, and the contents of the exchangeable cations of K, Na, Ca, Mg, to determine the mole amounts of $Na_2CO_3$, $NaHCO_3$, $Mg(HCO_3)_2$, exchangeable sodium ion, and exchangeable magnesium ion per kilograms of the alkali soil;

2) the theoretical application amount of the FGD byproduct applied per kilograms of the alkali soil is determined by the following formula (1), $$M=(\tfrac{1}{2}M_1+M_2+M_3+M_4+\tfrac{1}{2}M_5)\times Mn/(C\times 1000) \quad (1)$$

wherein:

M represents the theoretical application amount of the FGD byproduct, kilograms;

C represents the percent content by weight of the calcium sulfate in the FGD byproduct;

Mn represents the molecular weight of the calcium sulfate;

$M_1$ represents the molar amount of the exchangeable sodium ion in the alkali soil, $M_2$ represents the molar amount of the exchangeable magnesium ion in the alkali soil, $M_3$ represents the molar amount of $Mg(HCO_3)_2$ in the alkali soil, $M_4$ represents the molar amount of $Na_2CO_3$ in the alkali soil, and $M_5$ represents the molar amount of $NaHCO_3$ in the alkali soil, wherein the actual application amount of the FGD byproduct is 110% to 150%, preferably 120% to 140% of the theoretical application amount, According to the above and the soil with different alkalization degree, the range of application amount of the FGD byproduct is as follows, the application amount of the FGD byproduct is 18,000~22,500 kilograms per hectare for the alkali soil being slightly alkalized, the application amount of the FGD byproduct is above 22,500-30,000 kilograms per hectare for the alkali soil being moderately alkalized, and the application amount of the FGD byproduct is above 30,000-75,000 kilograms per hectare for the alkali soil being heavily alkalized;

3) Scattering the FGD byproduct from thermal power plants and facilities on the surface according to the alkalization degree, wherein Plowing the alkali soil by using spin-furrow plow when the FGD byproduct is applied, wherein the plowing depth is 20 to 40 cm, so as to make them being mixed well, wherein applying the FGD byproduct in the spring, and planting crops in the same year for an alkali soil having an alkalization degree of 10 to 30%, and applying the FGD byproduct in the summer, and not planting crops in the same year but planting in the next year for an alkali soil having an alkalization degree of above 30%.

4) Irrigating the alkali soil after the FGD byproduct is applied, and then, operating the soil and produce just like common land.

The irrigation water amount for irrigation after applying FGD byproduct from thermal power plants and facilities stated in step 4) should be controlled to an amount of about 1500 to 3000 cubic meters per hectare.

Compared with the prior art, this invention has the following advantages and excellent effects.

The invention provides a novel use for FGD byproduct from thermal power plants and facilities. That is, FGD byproduct from thermal power plants and facilities is used to improve alkali soil, thus changing waste to a useful substance, which has a better social and economic benefit.

Currently in China, desulfurization equipments installed and put into operation in thermal power plants with electric capacity exceeded 53,000 MW, and will exceed 60,000 MW by the end of 2006. By that time, the amount of the FGD byproduct will exceed 12,000,000 tons per year. When thermal power plants with the total electric capacity 300,000 MW in China are provided with flue gas desulfurization installations and put into operation, the amount of the FGD byproduct produced per year will be more than 60,000,000 tons per year. It is a huge number. If FGD byproduct from thermal power plants and facilities is thrown away because it cannot be used, a lot of land will be needed, which will seriously waste precious land resources. Moreover, it will lead to secondary environmental pollution. However, when the FGD byproduct is used to ameliorate alkali soil, it will bring us mass economic and social benefits. As to the large areas of alkali lands and the developing redeposit alkali land, the use of the FGD byproduct for alkali soil amelioration can turn large areas of badlands into oasis. Moreover, it can turn low and middle yield farmland to high yield and dependable crop yield farmland. This has a special meaning for settling the problem of food guarantee and the problem that FGD byproduct from thermal power plants and facilities pollute the environment, and it will recover the zoology vegetation, guard against wind and stable sand, and speed the actualization of west development strategy.

In the method for alkali soil amelioration by using FGD byproduct from thermal power plants and facilities, when calculating the application amount of gypsum, the amounts of $Na_2CO_3$, $NaHCO_3$, $Mg(HCO_3)_2$, the interchangeable sodium, and the interchangeable magnesium are taken into consideration, thus, the speed for amelioration is fast and the effect is obvious. Considering the aspect about the effect on the soil characteristics, the FGD byproduct can neutralize the alkalinity of the alkali soil, reduce the pH value and the alkalization degree of the alkali soil, lower the unit weight of the alkali soil, improve the physical behavior of the soil moisture, increase the crumb structure of the alkali soil, and provide a lot of Ca and S nourishment.

From the amelioration results, the rate of seed germination in the treated area is improved by 10%-75%, compared with that in the control area, and the biologic yield amount is increased by 48.8%-93.2%, the seed yield amount is increased by 48.8%-79.1%. Generally speaking, the higher the alkalization degree of the soil, the more obvious the effect is.

As for the economic benefit, the net income after the amelioration is 4.6 times higher than that prior to the amelioration for an alkali soil having a middle alkalization degree. The net income is negative prior tp the amelioration, but that after the amelioration can reach more than 875 US dollars per hectare for an alkali soil having a heavy alkalization degree.

DETAILED DESCRIPTION OF THE PREFERRED EMBODIMENT

The FGD byproduct from thermal power plants and facilities in this invention refers to the flue gas desulfurization byproduct from a coal fired power plant, and coal fired boilers, wherein the major component is more than 60% of $CaSO_4$ or $CaSO_3$, and the others are coal ash and water.

The specific method for alkali soil amelioration by using FGD byproduct from thermal power plants and facilities is as follows.

The alkali soil to be ameliorated is sampled, dried in the shade and screened, and then, mixed with water in a ratio of 1:1 by weight; and taken the extracting solution, and analyzed the contents of $CO_3^{2-}$, $HCO_3^-$, $SO_4^{2-}$, $Cl^-$, $Ca^{2+}$, $Mg^{2+}$, $K^+$, and $Na^+$ in the alkali soil, and the contents of the exchangeable cations of K, Na, Ca, Mg, to determine the mole amounts of $Na_2CO_3$, $NaHCO_3$, $Mg(HCO_3)_2$, exchangeable sodium ion, and exchangeable magnesium ion per kilograms of the alkali soil;

the theoretical application amount of the FGD byproduct applied per kilograms of the alkali soil is determined by the following formula (1), $$M=(\tfrac{1}{2}M_1+M_2+M_3+M_4+\tfrac{1}{2}M_5)\times Mn/(C\times 1000) \qquad (1)$$

wherein:
M represents the theoretical application amount of the FGD byproduct, kilograms;
C represents the percent content by weight of the calcium sulfate in the FGD byproduct;
Mn represents the molecular weight of the calcium sulfate;
$M_1$ represents the molar amount of the exchangeable sodium ion in the alkali soil,
$M_2$ represents the molar amount of the exchangeable magnesium ion in the alkali soil,
$M_3$ represents the molar amount of $Mg(HCO_3)_2$ in the alkali soil,
$M_4$ represents the molar amount of $Na_2CO_3$ in the alkali soil, and
$M_5$ represents the molar amount of $NaHCO_3$ in the alkali soil, wherein the actual application amount of the FGD byproduct is 110% to 150%, preferably 120% to 140% of the theoretical application amount.

According to the test and the actual measuring results, the relationship between the application amount of the FGD byproduct and the alkalization degree of the alkali soil is as follows:

the application amount of the FGD byproduct is 18,000~22,500 kilograms per hectare for the alkali soil being slightly alkalized (having an alkalization degree of 10 to 20%), the application amount of the FGD byproduct is above 22,500-30,000 kilograms per hectare for the alkali soil being moderately alkalized (having an alkalization degree of above 20 to 30%), and the application amount of the FGD byproduct is above 30,000-75,000 kilograms per hectare for the alkali soil being heavily alkalized (having an alkalization degree of above 30%).

The FGD byproduct is scattered on the surface according to the drawing. The alkali soil is plowed by using a spin-furrow plow when the FGD byproduct is applied, wherein the plowing depth is 20 to 40 cm, so as to make them mix well, wherein the FGD byproduct is applied in the spring, and crops are planted in the same year for an alkali soil having an alkalization degree of 10 to 30%, and the FGD byproduct is applied in the summer, and crops are not planted in the same year but planted in the next year for an alkali soil having an alkalization degree of above 30%. The alkali soil is irrigated after the FGD byproduct is applied. The irrigation water amount should be controlled to an amount of 2,250 cubic meters per hectare to dissolve the FGD byproduct to make it act on the alkali soil. After that, the soil is operated just like common land. There is no need for amelioration the next year. Normal agricultural production can continue, and the effect of amelioration can remain more than ten years.

The basic chemical equations between the main component (calcium sulfate) of the FGD byproduct and the components of the alkali soil to be improved are as follows:

$$Na_2CO_3+CaSO_4 \rightarrow CaCO_3+Na_2SO_4$$

$$2NaHCO_3+CaSO_4 \rightarrow Ca(HCO_3)_2+Na_2SO_4$$

$$Mg(HCO_3)_2+CaSO_4 \rightarrow Ca(HCO_3)_2+MgSO_4$$

$$\pm)2Na+CaSO_4 \rightarrow \pm)Ca+Na_2SO_4$$

$$\pm)Mg+CaSO_4 \rightarrow \pm)Ca+MgSO_4$$

Wherein
±)Na represents the exchangeable sodium ion,
±)Mg represents the exchangeable magnesium ion, and
±)Ca represents the exchangeable calcium ion.

EXAMPLES

Example 1

The Amelioration of Alkali Soil Having a Light Alkalization Degree

With regard to an alkali soil having alkalization degree of 10%, using the above method, the application amount of the FGD byproduct was 18,180 kilograms per hectare, the depth of plowing was 20 cm, and the irrigation amount of water was controlled to 2,250 cubic meters per hectare. The crop planted was corn which breed variety was Zhedan 7#; the sowing norm was 26 kilograms per hectare; and the sowing seed date was May 1 to 3. The rate of seed germination was 100%, the grain quantity of production was 8760 kilograms each hectare, which was increased 60.4% compared with the control area.

With regard to an alkali soil having alkalization degree of 17%, using the above method, the application amount of the FGD byproduct was 22,500 kilograms per hectare, and the depth of plowing was 20 cm. The crop planted was corn which breed variety was Zhedan 7#; the sowing norm was 26 kilograms per hectare; and the sowing seed date was May 1 to 3. The rate of seed germination was 100%, the grain quantity of production was 9315 kilograms each hectare, which was increased 70% compared with the control area.

Example 2

The Amelioration of Alkali Soil Having a Middle Alkalization Degree

With regard to an alkali soil having alkalization degree of 20%, using the above method, the application amount of the FGD byproduct was 23,400 kilograms per hectare, the depth of plowing was 20 cm, and the irrigation amount of water was controlled to 3,000 cubic meters per hectare. The crop planted was corn which breed variety was Zhedan 7#; the sowing norm was 26 kilograms per hectare; and the sowing seed date was May 1 to 3. The rate of seed germination was 100%, the grain quantity of production was 11,220 kilograms each hectare, which was increased 60.4% compared with the control area.

With regard to an alkali soil having alkalization degree of 28%, using the above method, the application amount of the FGD byproduct was 31,000 kilograms per hectare, and the depth of plowing was 20 cm. The crop planted was corn which breed variety was Zhedan 7#; the sowing norm was 26 kilograms per hectare; and the sowing seed date was May 1 to 3. The rate of seed germination was 100%, the grain quantity of production was 12,720 kilograms each hectare, which was increased 90% compared with the control area.

Example 3

The Amelioration of Alkali Soil Having a Heavy Alkalization Degree

With regard to an alkali soil having alkalization degree of 32%, using the above method, the application amount of the FGD byproduct was 33,450 kilograms per hectare, the depth of plowing was 20 cm, and the irrigation amount of water was controlled to 1500 cubic meters per hectare. The crop planted was corn which breed variety was Zhedan 7#; the sowing norm was 26 kilograms per hectare; and the sowing seed date was May 1 to 3. The rate of seed germination was 90%, the grain quantity of production was 11,265 kilograms each hectare, while the grain quantity of production in the control area was only 621 kilograms each hectare.

With regard to an alkali soil having alkalization degree of 79%, using the above method, the application amount of the FGD byproduct was 70,620 kilograms per hectare, and the depth of plowing was 40cm. The crop planted was corn which breed variety was Zhedan 7#; the sowing norm was 26 kilograms per hectare; and the sowing seed date was May 1 to 3. The rate of seed germination was 88%, the grain quantity of production was 7,380 kilograms each hectare, while the grain quantity of production in the control area was only 621 kilograms each hectare.

Example 4

The Amelioration of Alkali Soil Having a Middle Alkalization Degree Without Irrigation With regard to the alkali soil having alkalization degree of 20% in Example 2, using the above method, the application amount of the FGD byproduct was 23,400 kilograms per hectare, and the depth of plowing was 20 cm without irrigation. The crop planted was corn which breed variety was Zhedan 7#; the sowing norm was 26 kilograms per hectare; and the sowing seed date was May 1 to 3. The rate of seed germination was 70%, the grain quantity of production was 7,875 kilograms each hectare, which was 30% lower compared to the case with irrigation.

Example 5

With regard to the alkali soil having alkalization degree of 20%, gypsum was used in a conventional manner. The gypsum was applied in an amount equal to 15,000 kilograms of the FGD byproduct. The depth of plowing was 20 cm, and the irrigation amount of water was controlled to 3000 cubic meters per hectare. The crop planted was corn which breed variety was Zhedan 7#; the sowing norm was 26 kilograms per hectare; and the sowing seed date was May 1 to 3. The rate of seed germination was 80%, the grain quantity of production was 11,265 kilograms each hectare, while the grain quantity of production in the control area was only 9,405 kilograms each hectare, which was 15.7% lower compared to the case wherein the inventive method was used.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

We claim:

1. A method for alkali soil amelioration by using FGD byproduct (lime or limestone/gypsum process) from thermal power plants and facilities, comprising applying said FGD byproduct from thermal power plants and facilities into the alkali soil to be ameliorated, wherein the amount of the FGD byproduct from thermal power plants and facilities is determined by measuring the contents of $CO_3^{2-}$, $HCO_3^-$, $SO_4^{2-}$, $Cl^-$, $Ca^{2+}$, $Mg^{2+}$, $K^+$, and $Na^+$ in the alkali soil, and the contents of the exchangeable cations of K, Na, Ca, Mg, to determine the mole amounts of $Na_2CO_3$, $NaHCO_3$, $Mg(HCO_3)_2$, exchangeable sodium ion, and exchangeable magnesium ion per kilograms of the alkali soil;

wherein the theoretical application amount of the FGD byproduct from thermal power plants and facilities applied per kilograms of the alkali soil is determined by the following formula (1), $$M = (\tfrac{1}{2}M_1 + M_2 + M_3 + M_4 + M_5) \times Mn/(C \times 1000) \qquad (1)$$

wherein:

M represents the theoretical application amount of the FGD byproduct from thermal power plants and facilities, kilograms;

C represents the percent content by weight of the calcium sulfate in the FGD byproduct from thermal power plants and facilities;

Mn represents the molecular weight of the calcium sulfate;

$M_1$ represents the molar amount of the exchangeable sodium in the alkali soil, $M_2$ represents the molar amount of the exchangeable magnesium ion in the alkali soil, $M_3$ represents the molar amount of $Mg(HCO_3)_2$ in the alkali soil, $M_4$ represents the molar amount of $Na_2CO_3$ in the alkali soil, and $M_5$ represents the molar amount of $NaHCO_3$ in the alkali soil, wherein the actual application amount of the FGD byproduct from thermal power plants and facilities is 110% to 150% of the theoretical application amount, and wherein the relationship between the application amount of the FGD byproduct and the alkalization degree of the alkali soil is as follows:

the application amount of the FGD byproduct is 18,000-22,500 kilograms per hectare for the alkali soil being slightly alkalized having an alkalization degree of 10 to 20%, the application amount of the FGD byproduct is greater than 22,500 up to 30,000 kilograms per hectare for the alkali soil being moderately alkalized having an alkalization degree of greater than 20 up to 30%, and the application amount of the FGD byproduct is greater than 30,000 up to 75,000 kilograms per hectare for the alkali soil being heavily alkalized having an alkalization degree of above 30%.

2. The method according to claim 1, comprising:

plowing the alkali soil to a depth of 20-40 cm when the FGD byproduct from thermal power plants and facilities is applied, to mix them well, wherein for an alkali soil with alkalization degree of 10 to 30%, applying the FGD byproduct from thermal power plants and facilities in the spring, and planting crops in the same year, and for an alkali soil having an alkalization degree of above 30%, applying the FGD byproduct from thermal power plants and facilities in the summer, and not planting crops in the same year but planting in the next year.

3. The method according to claim 1, further comprising the step of irrigating the alkali soil after such FGD byproduct from thermal power plants and facilities is applied.

4. The method according to claim 3, wherein the amount of the irrigation water used is about 1500 to 3000 cubic meters per hectare.

* * * * *